May 27, 1969    J. P. HANCOCK    3,446,223
AIR INTAKE FOR GAS TURBINE ENGINES
Filed Feb. 4, 1966    Sheet 1 of 2
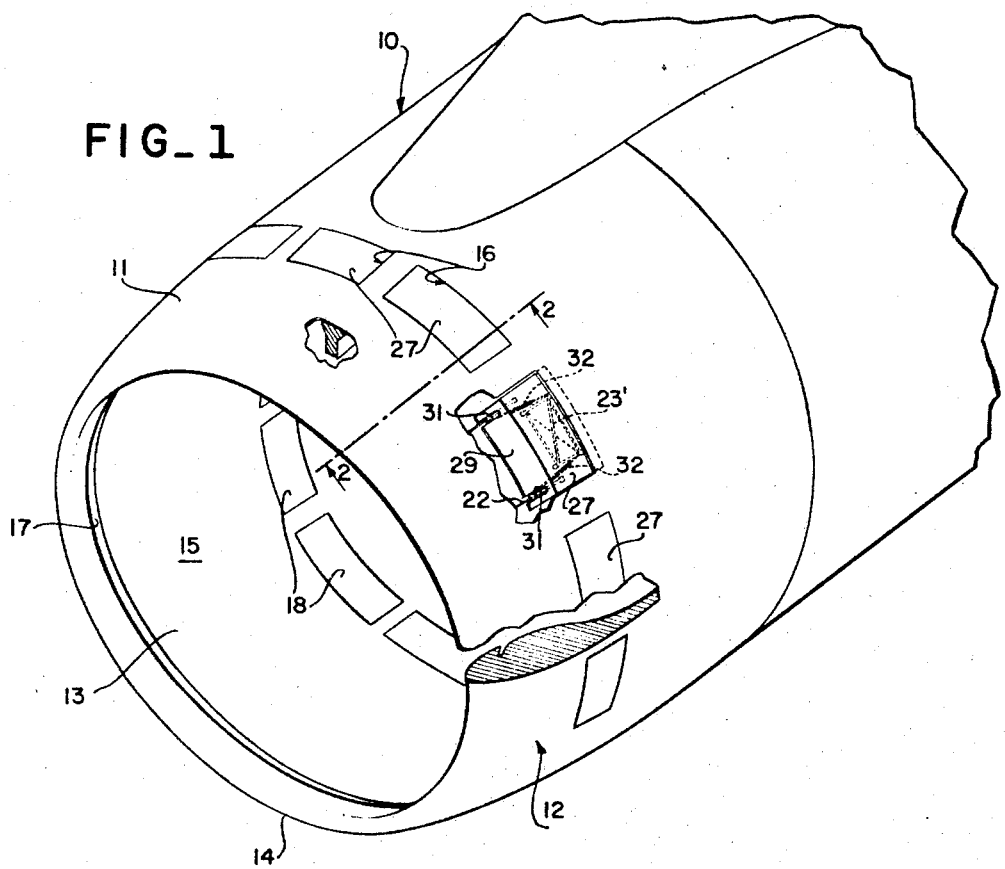
FIG_1
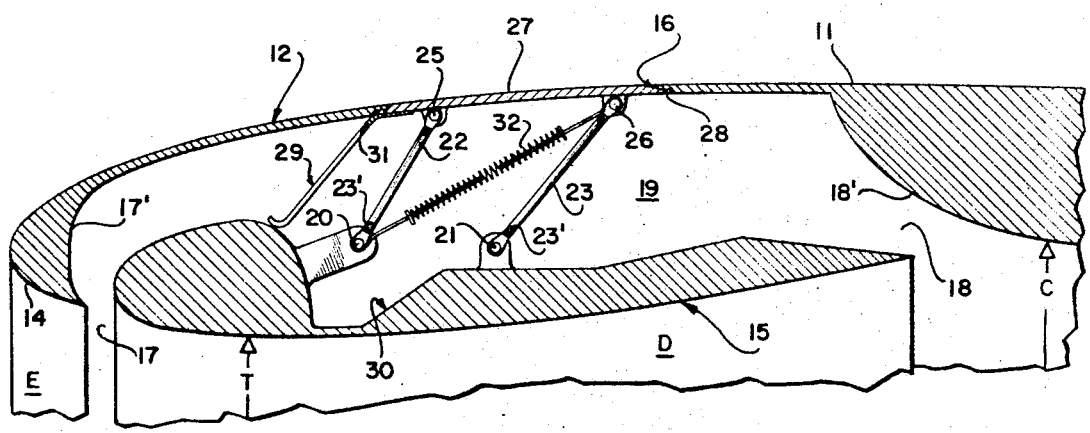
FIG_2
INVENTOR.
JOHN P. HANCOCK
BY
George C. Sullivan
Agent

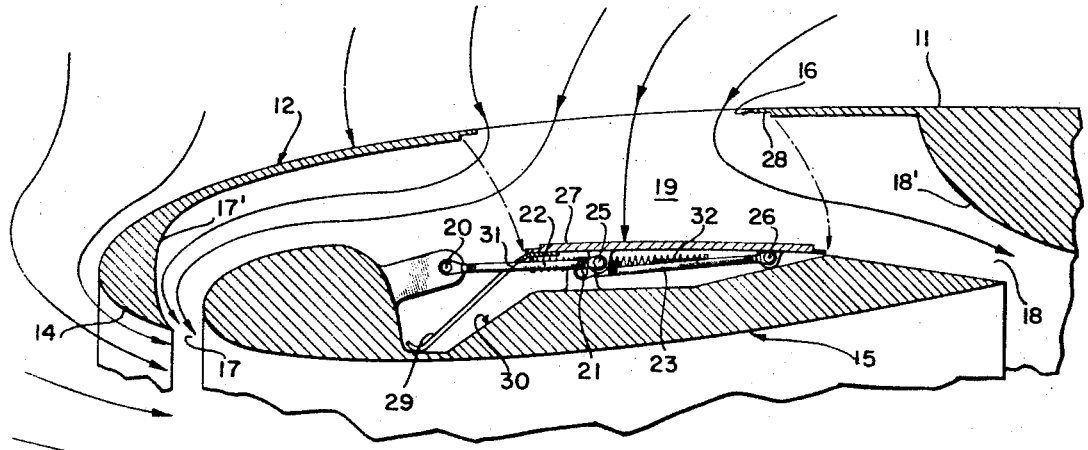
FIG_3
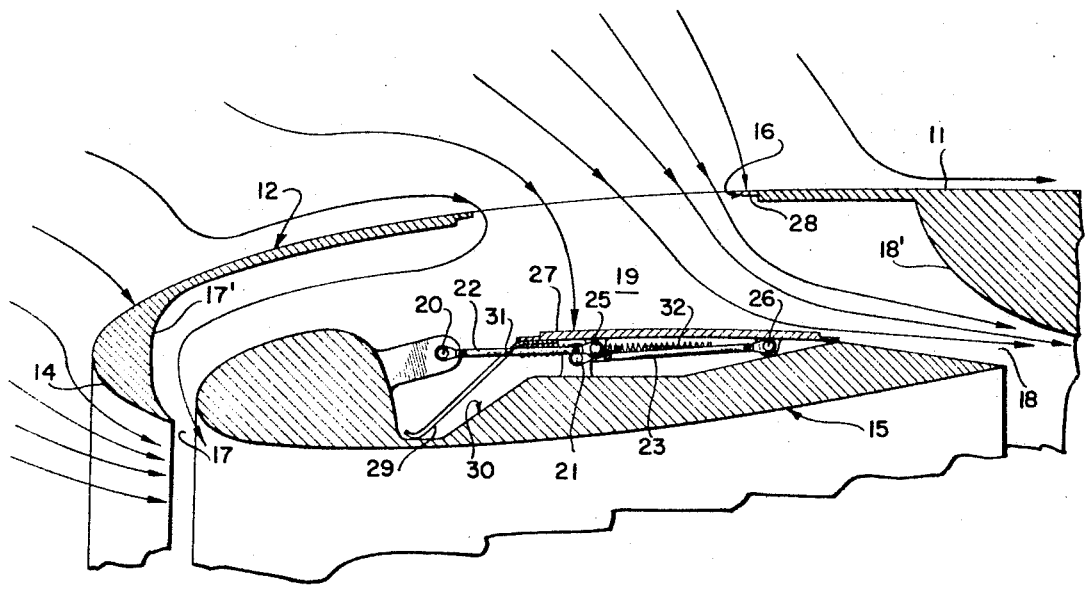
FIG_4

20 # United States Patent Office 3,446,223
Patented May 27, 1969

3,446,223
AIR INTAKE FOR GAS TURBINE ENGINES
John P. Hancock, Marietta, Ga., assignor to Lockheed
Aircraft Corporation, Burbank, Calif.
Filed Feb. 4, 1966, Ser. No. 525,063
Int. Cl. F02b 27/00
U.S. Cl. 137—15.2                    10 Claims

ABSTRACT OF THE DISCLOSURE

A double slotted inlet is designed to maximize total pressure recovery for a given size and weight in the static and low speed operating range without penalizing cruise performance. It accomplishes this objective by drawing in ambient air through an auxiliary inlet system and injecting it into a main duct system at two widely separated key positions. Thus, it provides an improvement of single slotted performance in the same manner that a double slotted flap system provides a higher maximum lift coefficient than a single slotted flap. As an added feature, a single door system supplies the two separate slots at different locations in the ducts.

---

This invention relates to air intake systems for gas turbine engines employed in aircraft and more particularly to such an intake providing multiple directional inflow channels with means for the regulation thereof in controlling air flow to the associated engine whereby maximum operating efficiency of the engine over the several operating regimes of the aircraft is obtained.

The wide range of operation demanded of present day aircraft imposes severe requirements on the power plant thereof. Thus, today's aircraft, among other things, must be capable of a short take-off and landing run from unimproved runways or terrain and extreme ranges of vertical and horizontal speeds with economical fuel consumption. To satisfy these requirements engine intakes must be adjustable to mass flow ratios and inflow speeds covering ranges far in excess of those heretofore employed. Initially, air ingestion has been accomplished by a variety of means that in essence vary the effective cross-sectional area and/or shape of the engine inlet or intake. In the more extreme cases power actuated variable geometry intake systems have been employed to satisfy the requirements of an engine inlet which must operate efficiently throughout a wide range of aircraft speeds and engine power settings.

The present invention is directed to improvements in engine air intake designs whereby greater efficiency of an engine over a wider range of operating conditions is achieved with less weight and complexity than was heretofore possible. To this end, there is provided a secondary air inlet having multiple nozzles arranged in spaced relation one to another and all in communication with the primary inlet at predetermined locations. This secondary inlet is angularly disposed with reference to the primary inlet and has associated with its removable closure means operative to control the flow of air therethrough.

The location of each nozzle from the secondary inlet with respect to the primary inlet is such as to reduce or eliminate a drop or loss of air pressure therein as would otherwise occur corresponding to different operating conditions of the aircraft and engine. Thus by operation of the closure means associated with the secondary inlet, the quantity, uniformity, and direction of air flow into and through the primary inlet to the engine is controlled and thereby adjusted to the particular engine requirements as determined by the given operating mode of the aircraft.

Generally stated, this control of the air flow is accomplished by the provision of spaced slots peripherally located around the engine intake in at least two rows with a common, secondary air inlet between each of such successive rows. This inlet is thus substantially normal to the axis of the engine and its primary air inlet and coacts with the associated slots to define channels that open into, for communication with, the primary inlet. A door or doors are associated with the secondary inlet, being adapted to overlie and close such inlet during the cruise flight regime of the aircraft. Thus disposed, the door or doors form a fairing surface for the intake. During the low speed, high power flight regimes of the aircraft the door or doors are adapted to move away from the secondary inlet thereby uncovering it as desired for the free flow of air therethrough.

As a result of increased efficiency achieved by the air flow control, the secondary inlet and nozzle arrangement as set forth above permits substantial shortening of the inlet duct and results in an appreciable weight saving to the aircraft. Thus, relatively short and thin wall intakes become possible since the inflow efficiency is no longer a function of the intake surface alone. Also, cruise inflow pressure losses, which are primarily a function of duct friction are substantially diminished due to the inlet duct length reduction permitted by the instant intake design concept.

With the above and other objects in view as will be apparent this invention consists in the construction, combination and arrangement of parts all as hereinafter more fully described, claimed and illustrated in the accompanying drawings wherein:

FIGURE 1 is an isometric view of a fragment of a conventional engine nacelle to show the air intake at the forward end thereof modified in accordance with the teachings hereof to incorporate a secondary inlet associated with the primary inlet;

FIGURE 2 is a section taken along line 2—2 of FIGURE 1 to show primarily the spaced nozzles or slots with the common inlet therefor and the mounting of the door associated therewith, the door being shown in the closed position corresponding to the cruise or horizontal flight regime of the aircraft;

FIGURE 3 is a similar view with the door open showing the air inflow pattern during static operation of the engine, i.e., a running of the engine with the aircraft on the ground and at rest; and FIGURE 4 is a similar view showing the air inflow pattern at aircraft lift-off.

Referring more particularly to the drawings 10 designates the forward portion of an engine housing or nacelle having an air intake 11 associated therewith. Intake 11 is generally circular having an aerodynamically clean external surface 12 and internally defines a primary inlet 13 having a forward lip 14 and a rearwardly extending internal surface 15 designed and adapted for the smooth flow of air into the engine.

The smallest transverse dimension of the inlet 13 establishes the throat T thereof, the size and location of which is predetermined and thereby matched to supply the air flow requirements of the engine under all flight conditions and aircraft operating regimes. Aft of the throat T the inlet 13 defines the diffuser section D which terminates at the compressor or fan face C of the engine which is not shown. The portion of the inlet 13 ahead of the throat T is the entry E.

The external surface 12 is pierced by a plurality of openings 16 arranged circumferentially around the intake 11, preferably to provide the maximum aggregate open area therein that is structurally possible, about eighty percent (80%). Coincident with the openings 16 is a peripheral row of forward slots 17 and a peripheral row of aft slots 18 in the surface 15 with reference to the openings 16 and a channel 19 through the intake 11 interconnecting each of the openings 16 and associated slots 17 and 18 located in a common fore and aft plane. Thus, a plurality of radial passages are established in the intake 11 all of which constitute a secondary inlet in communication with the primary inlet 13 to the engine. The walls 17' and 18' defining the radial passages adjacent the slots 17 and 18 respectively are arcuate being directed aftward to effect a smooth and gradual turning of the air flow as will become more apparent.

Mounted within each channel 19 is closure means operative to concurrently open or close communication between the associated opening 16 and slots 17 and 18 as well as between the slots 17 and 18 through the channel 19. To this end a pair of spaced, fixed hinges 20 and 21 are provided on the wall of the intake 11 defining such channel 19. One end of a pair of rigid links 22 is pivotally connected to hinge 20, the other end of each such link 22 being similarly connected as at 25 to a door 27 adjacent the forward end thereof. Similarly another pair of links 23 is connected between hinge 21 and, as at 26, to the aft end of the door 27. The several links 22 and 23 thereby constitute in effect a parallelogram adapted to establish and control the path of movement of its door 27 to and from extreme positions overlying and closing the adjacent opening 16 and internally of its channel 19 substantially against the remote wall thereof. If desired the stiffening ribs or crossover links 23' may be provided between the links 22 and 23 to ensure their rigidity. To facilitate a snug fit of each door 27 within its opening 16 when closed the overlying and abutting edges thereof are stepped, as at 28. This assures a clean and uninterrupted surface 12 for the intake 11.

At its forward end each door 27 carries an extension plate 29 angularly disposed relative to it and adapted to traverse the channel 19 when its door 27 is closed to thereby act as a blocker obstructing air flow through the channel 19. A localized area of the wall of the channel 19 is recessed, as at 30, to accommodate the blocker plate 29 when the door 27 is in the open position. The blocker plate 29 is provided with slots 31 to permit it to pass around each hinge 20 and link 22 during movement of the door 27 to and from its open and closed position.

Normally, the several doors 27 are maintained in the closed position by suitable means such as for example a compression spring 32 connecting each end of each door 27 to stationary structure of the intake 11. For this purpose this opposite ends of each spring 32 may be appropriately attached to the hinges 20 and 26 on corresponding sides of each door 27. The transverse dimension of the several channels 19 as defined by intake structure is such that the longitudinal centerline of each spring 32 is always disposed between the hinges 21 and 25 whereby it is constantly biased in the closed direction.

In view of the foregoing construction and arrangement the function and operation of the intake 11 should now be clear. When the engine is started the pressures acting on the internal surface 15 are reduced below those on the external surface 12 and the several doors 27 are automatically forced open. With the doors 27 open air enters as indicated by the arrows in FIGURE 3 and divides so that part of its travels forward and enters the primary inlet 13 at the entry E through slots 17 while the remainder travels aft and enters the primary inlet 13 at the exit of the diffuser section D through slots 18.

When the aircraft takes off, and approaches the high speed cruise condition or regime the pressures on the internal surface 15 exceed those on the external surface 12 and the doors 27 automatically return to the closed or faired position. During the cruise operation with the doors 27 in the closed position the blocker plates 29 close the several channels 19. This effectively prevents recirculation of air from the aft slots 18 to the forward slots 17 which might result in flow losses.

The function of the forward or lip slots 17 is to control air separation during static operation of the engine and very low speed and/or high angle of attack operation of the aircraft. Diffuser separation is controlled at the aft slots 18 from the zero to the intermediate speed range. Movement of the doors 27 is entirely aerodynamic and is primarily a function of the difference between the external and internal pressure acting thereon. The springs 32 sereve merely to overcome the effect of gravity by a predetermined amount to prevent the unintended opening of the door 27 by normal wind loads such as might occur when the engine is not running.

When the engine is operating with the aircraft on the ground and at rest, the direction of flow over the external surface 12 is forward and air entering the openings 16 travels toward the lip slots 17 with low losses and little change in direction (FIGURE 3). At the same time the lip surface pressures are extremely low in this region of the slots 17 due to the pumping effect of the air changing direction around the lip and leading edge of the intake 11. Thus a very high rate of flow per unit area is pumped through the forward slots 17 compared to the aft slots 18, and a relatively high percentage of the openings 16 are being employed to supply the forward slots 17. The advantage of this situation is that during static operation when air flow separation at the lip 14 causes the major portion of the intake system loss, the flow direction, i.e., the available percentage of inflow air and the available differential head, are such as to maximize the separation control capability of the forward slots 17.

As the aircraft accelerates on the runway approaching lift-off velocity the nacelle stagnation line (the dividing line between the air flow into the engine and the air flow aft around the nacelle 10) moves forward of the doors 27 and the inflow pattern is as illustrated by the arrows in FIGURE 4. At the same time air separation at the lip 14 diminishes until it is no longer a significant portion of the total inlet loss. Duct friction and air separation at the exit of the diffuser section D create most of the remaining pressure losses. Now the situation is reversed from the static case with the maximum potential improvement lying in the aft slots 18. The inflow direction has changed due to the speed of the aircraft and the air flow into the aft slots 18 now experiences the minimum turning losses.

It is, therefore, apparent that at all aircraft operating conditions involving low speed and high power setting, intake flow separation is controlled. Moreover, the maximum control potential is always available at and delivered to the particular slots 17 or 18 which need it the most under the particular flight conditions.

It is to be understood that while a particular embodiment of the invention has been hereinabove illustrated and described various changes and modifications thereto will suggest themselves to those skilled in the art. The true scope of the invention is, therefore, set forth and defined in the appended claims which alone recite limitations to be placed on this invention.

What is claimed is:

1. An air intake for a gas turbine engine of an aircraft comprising a primary air inlet to said engine, a secondary air inlet angularly disposed relative to said primary air inlet, both said air inlets being in direct communication with ambient air of the aircraft, multiple slots arranged in space relation one to another at predetermined locations along the length of, and all in communication with, said primary air inlet, a multiple directional channel interconnecting said secondary air inlet with said slots, and a movable closure associated with said channel and simultaneously operative to open and close said secondary air inlet to said ambient air and regulate the air flow from said primary air inlet through said slots.

2. The intake of claim 1 wherein said slots have a constant transverse dimension and are peripherally located in a fixed position around the intake in at least two rows and said secondary air inlet is located between, and common to, each successive two of said rows.

3. The intake of claim 2 wherein said primary air inlet includes an internal throat having a fixed location linearly relative to said engine, an air entry forward of said throat and a diffuser aft of said throat and wherein one of said rows of slots is in communication with said entry and the other of said rows of slots is in communication with said diffuser.

4. The intake of claim 1 wherein said channel is defined by arcuate walls directed aftward to effect a smooth and gradual turning of the air passing therethrough.

5. The intake of claim 2 wherein said secondary air inlet provides an aggregate opening equal to approximately eighty percent (80%) of the intake circumference.

6. The intake of claim 1 wherein said closure is operative in response to dynamic pressures acting thereon.

7. The intake of claim 2 wherein said secondary air inlet includes a plurality of discrete openings and said closure includes a door individual to each of said openings, rigid linkage pivotally connecting each said door to stationary intake structure to establish and control the path of movement thereof, a blocker plate extending from one end of each said door adapted to close said channel when said door closes its associated opening, and means complementary to each said blocker plate carried by said intake to receive said blocker plate when the door is in the open position whereby said channel is totally unobstructed thereby.

8. An air intake for a gas turbine engine of an aircraft comprising a primary air inlet adjacent the front of said engine in axial alignment therewith, a secondary air inlet formed by a plurality of radial passages in the intake wall defining said primary air inlet, each of said passages opening at one end externally of said intake in communication with ambient air of the aircraft and at the other end internally of said primary air inlet at different locations axially displaced one from another with respect to said engine, and a dynamically balanced door mounted within each of said passages for movement to and from extreme positions where it totally obstructs and totally unobstructs air flow through the associated passage.

9. The intake of claim 8 including resilient means of predetermined biasing strength in excess of the force of gravity connecting each door to said intake.

10. The intake of claim 8 wherein the ends of said passages opening internally of said primary air inlet as aforesaid each terminates in a slot adjacent the front of said primary inlet and a slot adjacent the rear of said primary air inlet.

References Cited

UNITED STATES PATENTS

| 2,689,614 | 9/1954 | Spalding. | |
| 2,788,184 | 4/1957 | Michael. | |
| 2,864,236 | 12/1958 | Toure | 137—15.1 |
| 2,906,089 | 9/1959 | Kadosch | 137—15.1 |

ALAN COHAN, *Primary Examiner.*